United States Patent
Oya et al.

(10) Patent No.: US 11,624,521 B2
(45) Date of Patent: Apr. 11, 2023

(54) ELECTRIC MOTOR AND AIR-CONDITIONING APPARATUS INCLUDING SAME

(71) Applicant: Mitsubishi Electric Corporation, Tokyo (JP)

(72) Inventors: Junichiro Oya, Tokyo (JP); Mineo Yamamoto, Tokyo (JP); Hiroyuki Ishii, Tokyo (JP); Yuto Urabe, Tokyo (JP); Takaya Shimokawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 478 days.

(21) Appl. No.: 16/630,216

(22) PCT Filed: Sep. 11, 2017

(86) PCT No.: PCT/JP2017/032657
§ 371 (c)(1),
(2) Date: Jan. 10, 2020

(87) PCT Pub. No.: WO2019/049361
PCT Pub. Date: Mar. 14, 2019

(65) Prior Publication Data
US 2020/0208859 A1    Jul. 2, 2020

(51) Int. Cl.
*F24F 11/30* (2018.01)
*H02K 11/21* (2016.01)

(52) U.S. Cl.
CPC .............. *F24F 11/30* (2018.01); *H02K 11/21* (2016.01); *F24F 2203/1068* (2013.01)

(58) Field of Classification Search
CPC .............. F24F 11/30; F24F 2203/1068; H02K 11/21; H02K 29/08; H02K 11/215; H02K 1/27
See application file for complete search history.

(56) References Cited

U.S. PATENT DOCUMENTS 6,548,981 B1    4/2003  Ishii et al.
8,653,774 B2 *  2/2014  Shimizu ............... H02P 6/16
                                                318/400.38

(Continued)

FOREIGN PATENT DOCUMENTS

CN    203562922 U    4/2014
JP    S55-181492 U   12/1980

(Continued)

OTHER PUBLICATIONS

International Search Report of the International Searching Authority dated Dec. 5, 2017 in corresponding International Patent Application No. PCT/JP2017/032657 (and English translation).

(Continued)

*Primary Examiner* — Bickey Dhakal
(74) *Attorney, Agent, or Firm* — Posz Law Group, PLC

(57) ABSTRACT

An electric motor includes a stator, a rotor, and a magnetic sensor. The stator has an iron core and a magnetic flux coil. The rotor has a rotary shaft and a cylindrical rotor magnet. The magnetic sensor has a sensor unit that outputs an electric signal based on an applied magnetic flux. The rotor magnet is disposed so as to face the iron core of the stator. The rotor magnet has a main magnet unit and a sensor magnet unit that is formed integrally with the main magnet unit and has an external diameter smaller than an external diameter of the main magnet unit. The magnetic sensor is disposed beside the sensor magnet unit. An outer circumferential edge of the sensor magnet unit is located farther away from the rotary shaft than a center of the sensor unit. The magnetic sensor is configured such that a center of the sensor unit and a center of the magnetic sensor do not match each other, and the center of the sensor unit is closer to the sensor magnet unit than the center of the magnetic sensor.

7 Claims, 6 Drawing Sheets

(56) References Cited

U.S. PATENT DOCUMENTS

| | | | | |
|---|---|---|---|---|
| 2013/0234546 A1* | 9/2013 | Kim | ................ | H02K 11/21 |
| | | | | 310/59 |
| 2014/0139078 A1* | 5/2014 | Miwa | ................ | H02K 29/08 |
| | | | | 310/68 B |
| 2016/0128195 A1* | 5/2016 | Matsunaga | ............ | H05K 3/303 |
| | | | | 29/841 |

FOREIGN PATENT DOCUMENTS

| | | | | | |
|---|---|---|---|---|---|
| JP | H11-299207 | A | 10/1999 | | |
| JP | 2000-299970 | A | 10/2000 | | |
| JP | 2002-078309 | A | 3/2002 | | |
| JP | 2002-199771 | A | 7/2002 | | |
| JP | 2003-319631 | A | 11/2003 | | |
| JP | 2014-103721 | A | 6/2014 | | |
| KR | 2001062448 | A * | 7/2001 | ............ | B60K 6/26 |

OTHER PUBLICATIONS

Chinese Office Action dated Jul. 5, 2021, issued in corresponding CN Patent Application No. 201780094667.4 (and English Machine Translation).

* cited by examiner

ELECTRIC MOTOR AND AIR-CONDITIONING APPARATUS INCLUDING SAME

CROSS REFERENCE TO RELATED APPLICATION

This application is a U.S. national stage application of PCT/JP2017/032657 filed on Sep. 11, 2017, the contents of which are incorporated herein by reference.

TECHNICAL FIELD

The present invention relates to an electric motor and an air-conditioning apparatus including the electric motor as a drive source.

BACKGROUND ART

Some related-art electric motors include a rotor and a stator. The rotor has a rotary shaft that is provided at a center of a motor case such that it can rotate and a rotor magnet that is provided around the rotary shaft. The stator has an iron core and a magnetic flux coil wound around the iron core. The rotor and the stator are disposed so that the iron core of the stator surrounds the rotor magnet of the rotor. Furthermore, a magnetic sensor that detects a position of the rotor magnet of the rotor is provided. The position of the rotor magnet is determined by calculation based on output of the magnetic sensor, and a current for driving the magnetic flux coil is controlled based on positional information of the rotor so that desired rotation output is obtained (see, for example, Patent Literature 1).

CITATION LIST

Patent Literature

Patent Literature 1: Japanese Unexamined Patent Application Publication No. 2003-319631

SUMMARY OF INVENTION

Technical Problem

Since the magnetic sensor detects the position of the rotor magnet, the magnetic sensor is disposed beside the rotor magnet in an axial direction of the rotary shaft. However, the rotor magnet is surrounded by the iron core of the stator, and the magnetic flux coil is wound around the iron core. For this reason, the magnetic sensor may often be affected by a magnetic flux leaking from the magnetic flux coil of the stator depending on a position where the magnetic sensor is disposed. The magnetic flux leaking from the magnetic flux coil may cause phase shift of magnetic sensor output. This undesirably decreases efficiency of the electric motor and thereby causes a decrease in maximum output of the electric motor.

The present invention has been accomplished to solve the above problem, and an object of the present invention is to provide an electric motor that keeps a high level of efficiency and maximum output and an air-conditioning apparatus including the electric motor.

Solution to Problem

An electric motor according to an embodiment of the present invention includes a stator having an iron core and a magnetic flux coil wound around the iron core; a rotor having a rotary shaft and a cylindrical rotor magnet provided on an outer circumference of the rotary shaft; and a magnetic sensor having a sensor unit that outputs an electric signal based on an applied magnetic flux, the stator and the rotor being disposed so that the rotor magnet faces the iron core, wherein the rotor magnet has a main magnet unit and a sensor magnet unit that is formed integrally with the main magnet unit and has an external diameter smaller than an external diameter of the main magnet unit, the magnetic sensor is disposed beside the sensor magnet unit and outputs the electric signal upon detection of a position of the rotor based on a magnetic flux of the sensor magnet unit, and an outer circumferential edge of the sensor magnet unit is located farther away from the rotary shaft than a center of the sensor unit.

An air-conditioning apparatus according to an embodiment of the present invention includes the electric motor described above as a drive source of at least one of an indoor-unit fan and an outdoor-unit fan.

Advantageous Effects of Invention

According to the electric motor according to the embodiment of the present invention, influence of a magnetic flux leaking from the magnetic flux coil of the stator on the magnetic sensor is reduced, and a magnetic flux from the sensor magnet unit is more strongly applied to the magnetic sensor. As a result, maximum output of the electric motor can be kept at a high level. Furthermore, with the air-conditioning apparatus according to the embodiment of the present invention, the indoor-unit fan and the outdoor-unit fan can be driven efficiently.

DESCRIPTION OF EMBODIMENTS

Figure 1:
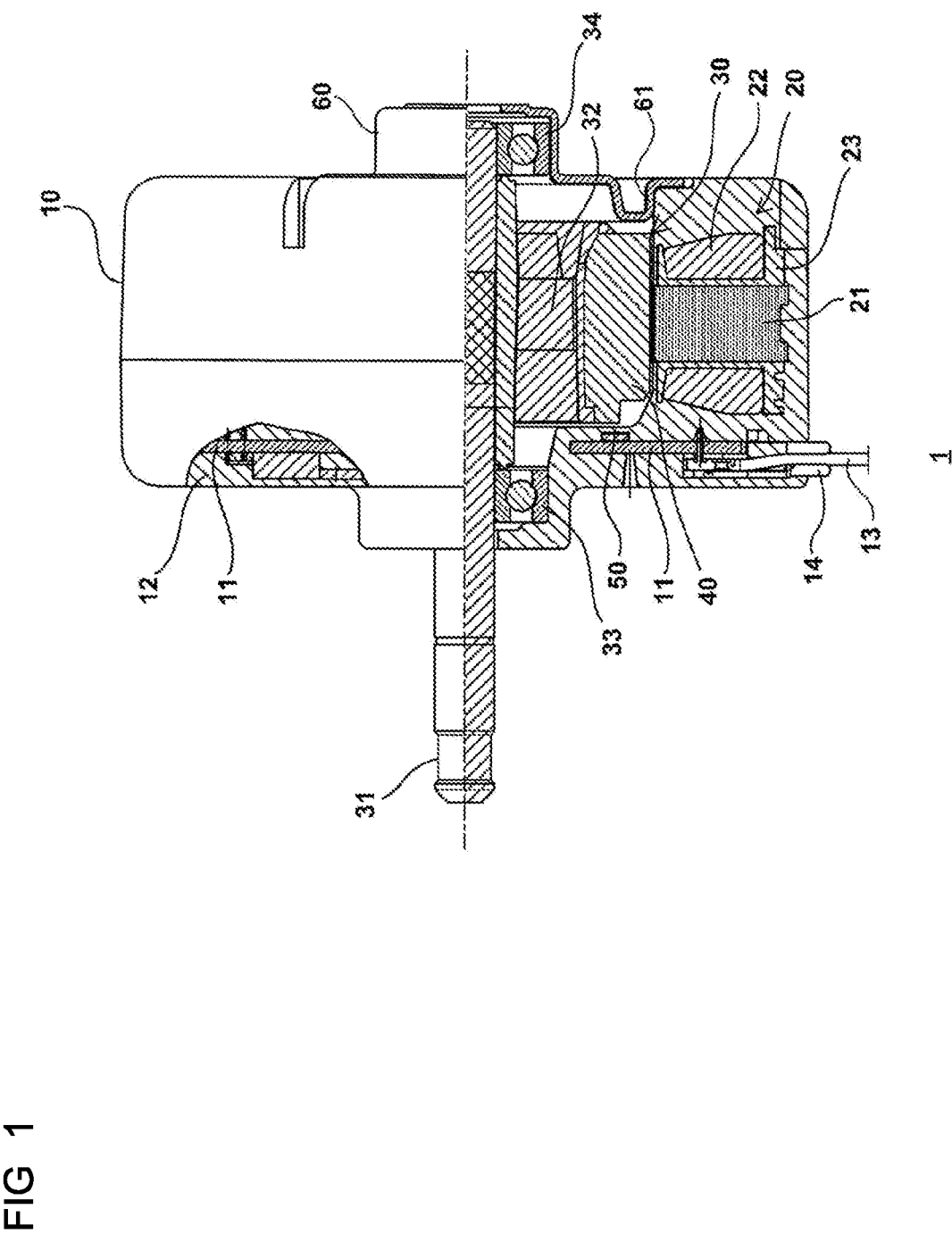
FIG. 1 illustrates an electric motor according to Embodiment 1 of the present invention.

Embodiments of an electric motor according to the present invention are described in detail below with reference to the drawings. Note that Embodiments given below are not restrictive. Sizes of components in the drawings may be different from those of an actual apparatus.

Embodiment 1

FIG. 1 illustrates an electric motor according to Embodiment 1 of the present invention. FIG. 1 illustrates a partial cross section of a part of the electric motor 1 taken along a plane including a shaft center of a rotary shaft 31, which will be described later. The electric motor 1 is a three-phase brushless direct-current (DC) motor and has a mold stator 10, a rotor 30, a magnetic sensor 50, and a bracket 60.

The mold stator 10 has a stator 20, and a disk-shaped built-in substrate 11, and a mold resin 12 for molding. The stator 20 has a stator core 21, a magnetic flux coil 22, and an insulator 23. The stator core 21 is a ring-shaped element and is formed of magnetic steel sheets that are stacked one on another. The stator core 21 has a plurality of slots (not illustrated) that are provided at constant intervals in a circumferential direction. The insulator 23 is an insulating element and is molded integrally with the plurality of slots. In each of the plurality of slots, the magnetic flux coil 22 is wound around the stator core 21. In the stator 20, the magnetic flux coil 22 forms three phases as described later. The stator 20 and the built-in substrate 11 are integrally molded by using the mold resin 12. A thermosetting resin is used for the mold resin 12. The mold stator 10 has therein a recess in which the rotor 30 is accommodated.

The rotor 30 has a rotary shaft 31, a rotor insulating unit 32, and a rotor magnet 40. The rotor insulating unit 32 is an annular element and is provided on an outer circumferential part of the rotary shaft 31. The rotor magnet 40 is a cylindrical element and is provided on an outer circumference of the rotor insulating unit 32. An outer circumferential surface of the rotor magnet 40 that is opposite to the rotor insulating unit 32 faces the stator core 21. The rotary shaft 31 is supported by an output-side shaft bearing 33 and a counter-output-side shaft bearing 34 so as to rotate about a shaft center. The rotor magnet 40 is produced by injection molding a ferrite magnet or a bond magnet obtained by mixing a rare-earth magnet with a thermoplastic resin material. A mold for the injection molding has a magnet incorporated therein, and the rotor magnet 40 is molded while applying magnetic field orientation.

The bracket 60, which is an electrically conductive element, is fitted into an inner circumferential part of the mold stator 10 so as to block an opening of the recess of the mold stator 10 and supports the counter-output-side shaft bearing 34. An outer ring of the counter-output-side shaft bearing 34 is fitted into an inner side of a bottom part of the bracket 60, and a press-fitted part 61 of the bracket 60 having a U-shaped cross section is press-fitted into the opening of the mold stator 10.

The built-in substrate 11 includes a circuit on which a power integrated circuit (IC), a control unit, and a magnetic sensor 50 are mounted. The built-in substrate 11 is disposed between the output-side shaft bearing 33 and the stator 20 so as to be perpendicular to an axial direction of the rotary shaft 31. The power IC and the control unit will be described later. The built-in substrate 11 is a substrate according to the present invention.

The magnetic sensor 50 is, for example, a hall IC and is a sensor that detects a position of the rotor 30. Three magnetic sensors 50 are mounted on the built-in substrate 11 corresponding to the three phases of the magnetic flux coil 22 of the stator 20. The hall IC outputs a digital signal and is classified into two types. One type is a type configured such that a sensor unit and an amplifying unit are separate semiconductor chips, and the sensor unit is made of a semiconductor other than silicon, and the amplifying unit is made of silicon. Hereinafter, this type is referred to as a non-silicon-type hall IC. The other type is a type configured such that a sensor unit and an amplifying unit are provided by a single silicon semiconductor chip. In Embodiment 1, the non-silicon-type hall IC is used as the magnetic sensor 50. The magnetic sensor 50 will be described later.

A lead-out unit 14 having a lead wire 13 is disposed on the built-in substrate 11. The lead wire 13 is connected to a higher-order system for the electric motor 1, for example, to a unit-side substrate of the air-conditioning apparatus. A control IC, a magnetic sensor, and a passive component are disposed on a stator surface of the built-in substrate 11. The passive component includes a resistor and a capacitor. In a case where the power IC is a lead type, only the power IC is disposed on a counter stator surface and can be mounted by a single-sided flow process. In a case where the power IC is a surface mount type, the power IC is also disposed on a stator surface and can be mounted by single-sided reflow. Note that the control unit and the power IC of the electric motor 1 may be provided by a single IC.

Figure 2:
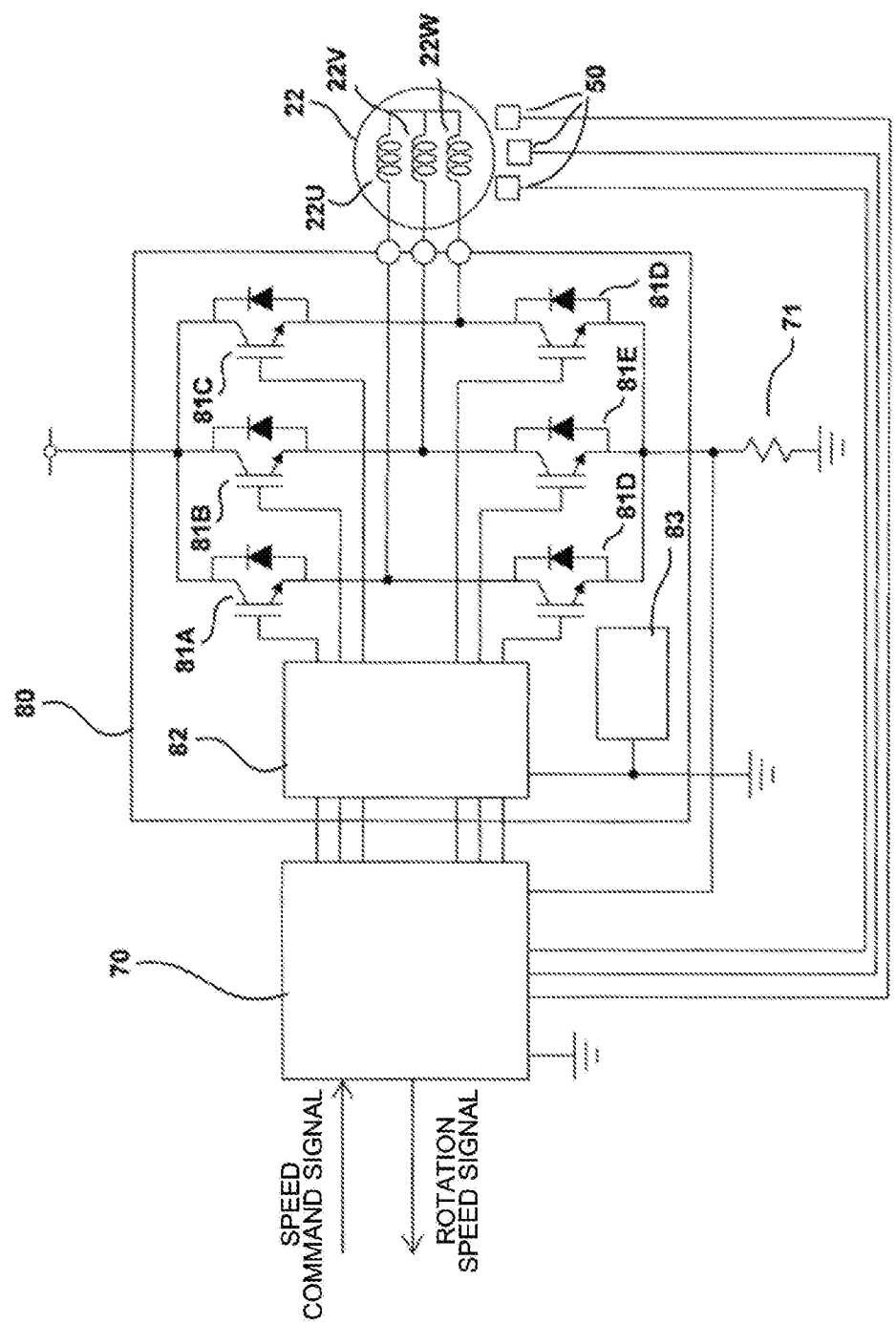
FIG. 2 is a block diagram of the electric motor according to Embodiment 1 of the present invention.

FIG. 2 is a block diagram of the electric motor according to Embodiment 1 of the present invention. A control unit 70 controls the electric motor 1 as a whole and is a dedicated IC or a microcontroller. A power IC 80 and the magnetic flux coil 22 of the stator 20 are connected to each other through a magnetic flux coil terminal. The electric motor 1 obtains rotating power by switching six power transistors 81A, 81B, 81C, 81D, 81E, and 81F that form the power IC 80 at an appropriate timing in accordance with a magnetic pole position of the rotor magnet 40 of the rotor 30. Hereinafter, the power transistors 81A through 81F are often collectively referred to as power transistors 81.

The power transistors 81 are insulated gate bipolar transistors (IGBTs) and are bridge-connected. A magnetic pole position signal is input from the three magnetic sensors 50, which are hall ICs, to the control unit 70. Furthermore, a speed command signal output from the higher-order system is input to the control unit 70. The control unit 70 determines by calculation the magnetic pole position of the rotor 30 based on the input magnetic pole position signal and generates a switching signal in accordance with the determined magnetic pole position of the rotor 30 and the speed command signal. The switching signal is output to the power IC 80.

The switching signal that has been output to the power IC 80 is input to a gate drive circuit 82 of the power IC. The gate drive circuit 82 generates signals for driving the six power transistors 81A through 81F based on the switching signal and inputs the signals to the power transistors 81A through 81F. As a result, driving currents are sequentially supplied to a U-phase winding 22U, a V-phase winding 22V, and a W-phase winding 22W of the magnetic flux coil 22 of the stator 20 to excite the U-phase winding 22U, the V-phase winding 22V, and the W-phase winding 22W. As a result, the rotor 30 illustrated in FIG. 1 rotates.

As described above, a rotation position of the rotor 30 is detected by the three magnetic sensors 50, which are hall ICs. Digital position signals output from the magnetic sensors 50 are input to the control unit 70. The control unit 70 determines by calculation a rotation speed of the rotor 30 based on the input position signals. A signal indicative of the rotation speed of the rotor 30 is transmitted from the control unit 70 to the higher-order system for the electric motor 1.

The control unit 70 realizes overcurrent protection by forcibly turning the power transistors 81A through 81F off when a voltage between both ends of an overcurrent detection resistor 71 reaches a certain voltage or higher. Furthermore, the control unit 70 realizes superheat protection by forcibly turning the power transistors 81A through 81F off upon receipt of a signal from a thermosensor (not illustrated).

On the built-in substrate 11, the power transistors 81A through 81F, the gate drive circuit 82, a protection circuit 83, the overcurrent detection resistor 71 between the gate drive circuit 82 and the power transistors 81, and a gate circuit (not illustrated) may be separate components.

Typically, in a case where a power-supply voltage of a drive circuit is high, patterns of the circuit need to be spaced apart one from another for an insulating distance. This makes pattern wiring difficult. In particular, the drive circuit provided in the electric motor 1 is subjected to spatial restrictions. In this case, a gate circuit for an upper arm, which is a high-voltage circuit, is disposed on a substrate surface opposite to a substrate surface on which the power transistors 81 are disposed, and a gate circuit for a lower arm, which is a low-voltage circuit, is disposed on the substrate surface on which the power transistors 81 are disposed. This allows pattern wiring in a smaller area. This pattern wiring is effective especially in a case where the power transistors 81 are surface-mounted components.

Note that the electric motor 1 may include a substrate on which only the magnetic sensors 50, a resistor, and a capacitor are mounted, and the power IC 80 and the control unit 70 may be externally attached to the electric motor 1. The power transistors 81 are IGBTs but may be metal-oxide-semiconductor field-effect-transistors (MOSFETs).

Figure 3:
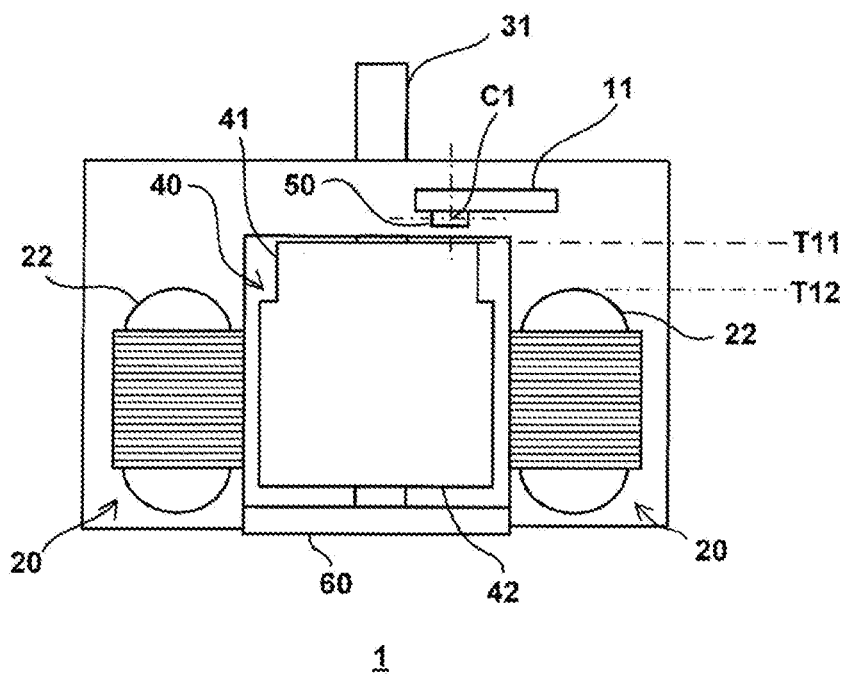
FIG. 3 schematically illustrates an inside of the electric motor according to Embodiment 1 of the present invention.
Figure 4:
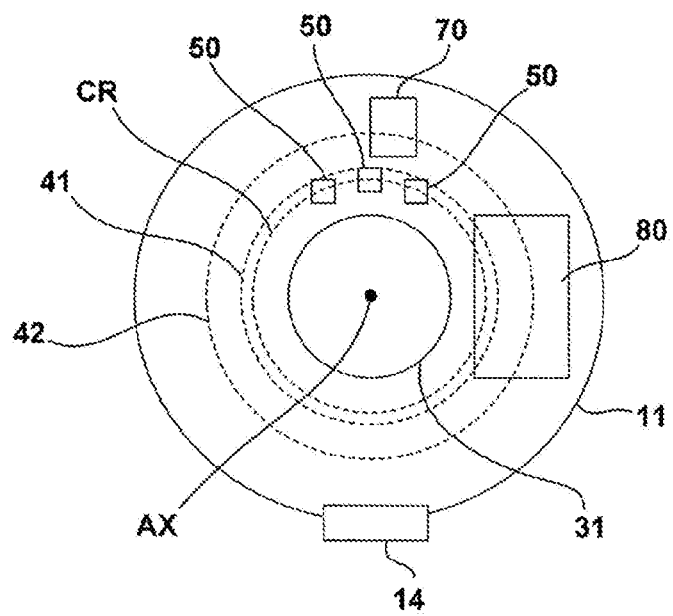
FIG. 4 illustrates a relative positional relationship among some elements of the electric motor according to Embodiment 1 of the present invention.

FIG. 3 schematically illustrates an inside of the electric motor according to Embodiment 1 of the present invention. FIG. 4 illustrates a relative positional relationship among some elements of the electric motor according to Embodiment 1 of the present invention. FIG. 4 illustrates some elements of the electric motor 1 projected on a virtual plane perpendicular to the rotary shaft 31. As illustrated in FIG. 3, the rotor magnet 40 has a sensor magnet unit 41 disposed close to the magnetic sensors 50 and a main magnet unit 42 disposed close to the bracket 60. The sensor magnet unit 41 is formed integrally with the main magnet unit 42. An external diameter of the sensor magnet unit 41 is smaller than an external diameter of the main magnet unit 42. Furthermore, to minimize influence of a magnetic flux generated from the magnetic flux coil 22 of the stator 20, the magnetic sensors 50 are disposed farther from the magnetic flux coil 22, that is, closer to the rotary shaft 31.

As illustrated in FIG. 4, on a virtual plane perpendicular to the rotary shaft 31, the external diameter of the sensor magnet unit 41 is larger than a circle CR whose center is located at a shaft center AX of the rotary shaft 31 and that passes through sensor centers of the magnetic sensors 50. In other words, an outer circumferential edge of the sensor magnet unit 41 is located farther away from the rotary shaft 31 than centers C1 of the magnetic sensors 50.

Furthermore, in an axial direction of the rotary shaft 31, a position T11 of one end on the magnetic sensors 50 side of the sensor magnet unit 41 is located closer to the magnetic sensors 50 than a position T12 of one coil end on the magnetic sensors 50 side of the magnetic flux coil 22 of the stator 20.

Figure 5:
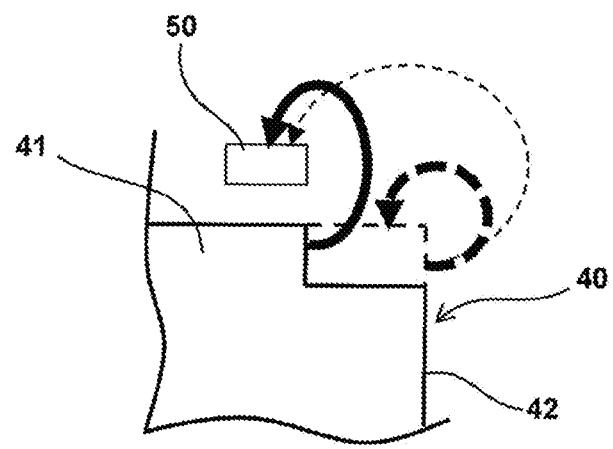
FIG. 5 schematically illustrates a magnetic flux applied to a magnetic sensor of the electric motor according to Embodiment 1 of the present invention.

FIG. 5 schematically illustrates a magnetic flux applied to the magnetic sensor of the electric motor according to Embodiment 1 of the present invention. A position of the sensor magnet unit 41 and a magnetic flux applied from the sensor magnet unit 41 to the magnetic sensors 50 in a case where the external diameter of the sensor magnet unit 41 is identical to the external diameter of the main magnet unit 42 are indicated by the dotted lines. Since the rotor magnet 40 is molded while applying magnetic field orientation as described above, magnetic force emitted from an outer circumference is larger than magnetic force emitted from an end in an axial direction. If the external diameter of the sensor magnet unit 41 is identical to the external diameter of the main magnet unit 42, a magnetic flux having relatively small magnetic force indicated by the thin dotted line flows into the magnetic sensors 50 in a case where the magnetic sensors 50 are disposed closer to the rotary shaft 31 as described above. However, a magnetic flux having relatively large magnetic force indicated by the thick dotted line is hard to flow into the magnetic sensors 50. Meanwhile, by making the external diameter of the sensor magnet unit 41 smaller as described above, it is possible to increase the number of magnetic fluxes having large magnetic force that flow from the rotor magnet 40 to the magnetic sensors 50 as indicated by the thick solid line.

Furthermore, by making the external diameter of the sensor magnet unit 41 larger than the circle CR whose center is located at the shaft center AX of the rotary shaft 31 and that passes through the sensor centers of the magnetic sensors 50, a magnetic flux emitted from the magnetic flux coil 22 of the stator 20 can be blocked by the sensor magnet unit 41. As a result, influence of a magnetic flux generated from the magnetic flux coil 22 on the magnetic sensors 50 can be kept small. If a magnetic flux of the magnetic flux coil 22 is applied to the magnetic sensors 50, the applied magnetic flux causes phase shift of output of the magnetic sensors 50, resulting in a decrease in maximum output and efficiency of the electric motor 1. Meanwhile, according to Embodiment 1, influence of a magnetic flux generated from the magnetic flux coil 22 can be kept small, and therefore a decrease in maximum output of the electric motor 1 can be kept small. This allows the electric motor 1 to keep a high level of efficiency.

Furthermore, according to Embodiment 1, the position T21 on the magnetic sensors 50 side of one end of the sensor magnet unit 41 is closer to the magnetic sensors 50 than the position T12 of one coil end on the magnetic sensors 50 side of the magnetic flux coil 22. With this configuration, a magnetic flux leaking from the magnetic flux coil 22 of the stator 20 can be blocked by the sensor magnet unit 41, and therefore influence of the magnetic flux leaking from the magnetic flux coil 22 of the stator 20 on the magnetic sensors 50 can be kept small. As a result, malfunction of the electric motor 1 caused by phase shift can be made less likely to occur, and a decrease in maximum output of the electric motor 1 can be kept small. This allows the electric motor 1 to keep a high level of efficiency.

Figure 6:
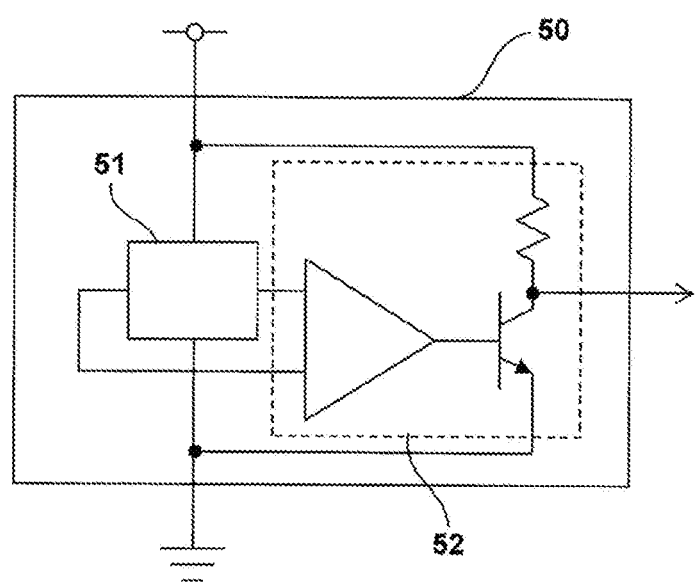
FIG. 6 is a block diagram of the magnetic sensor of the electric motor according to Embodiment 1 of the present invention.
Figure 7:
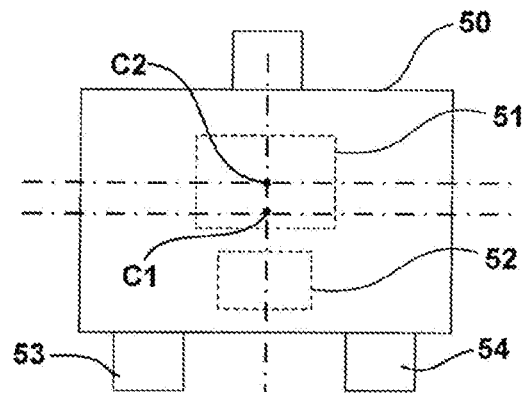
FIG. 7 schematically illustrates an internal configuration of the magnetic sensor of the electric motor according to Embodiment 1 of the present invention.

FIG. 6 is a block diagram of the magnetic sensor of the electric motor according to Embodiment 1 of the present invention. FIG. 7 schematically illustrates an internal configuration of the magnetic sensor of the electric motor according to Embodiment 1 of the present invention. Each of the magnetic sensors 50 has a sensor unit 51 and an amplifying unit 52. The sensor unit 51 outputs an electric signal based on an applied magnetic flux, and the amplifying unit 52 amplifies the electric signal output from the sensor unit 51. A semiconductor chip of the sensor unit 51 is made of a semiconductor (e.g., indium antimonide) other than silicon, and a semiconductor chip of the amplifying unit 52 is made of silicon. An output stage is formed of a bipolar transistor and a pull-up resistor in FIG. 6 but is not restrictive. The output stage may be push-pull output, and the transistor may be a metal-oxide-semiconductor (MOS).

As illustrated in FIG. 7, the magnetic sensor 50 is provided with a pin 53 and a pin 54 that are connected to the built-in substrate 11 illustrated in FIG. 1. A center C2 of the sensor unit 51 does not match the center C1 of a body of the magnetic sensor 50 in an up-down direction of the magnetic sensor 50. Specifically, the sensor unit 51 is disposed in the magnetic sensor 50 so that the center C2 thereof is closer, in the up-down direction of the magnetic sensor 50, to a side opposite to a side on which the pin 53 and the pin 54 are provided than to the side on which the pin 53 and the pin 54 are provided. Note that the center C2 of the sensor unit 51 matches the center C1 of the magnetic sensor 50 in a lateral direction of the magnetic sensor 50. As described above, the outer circumferential edge of the sensor magnet unit 41 is located farther away from the rotary shaft 31 than the centers C1 of the magnetic sensors 50. Accordingly, the outer circumferential edge of the sensor magnet unit 41 is located farther away from the rotary shaft 31 than the center C2 of the sensor unit 51.

The magnetic sensors 50 are mounted on a surface of the built-in substrate 11 that faces the rotor magnet 40 as illustrated in FIG. 3. The magnetic sensors 50 are mounted with use of the pin 53 and the pin 54. Accordingly, the sensor unit 51 is located closer to the rotor magnet 40 in a state where the magnetic sensors 50 are mounted on the built-in substrate 11. As a result, the number of magnetic fluxes that flow from the rotor magnet 40 into the magnetic sensors 50 can be increased, and therefore detection of a position of the rotor 30 can be executed more precisely.

As described above, in Embodiment 1, the stator 20 and the built-in substrate 11 are molded integrally with each other with use of the mold resin 12, and therefore stress is generated on the magnetic sensors 50. Accordingly, in a case where the semiconductor chip of the sensor unit 51 is made of silicon, large offset may often occur. However, in Embodiment 1, the semiconductor chip of the sensor unit 51 is made of a semiconductor other than silicon, and therefore offset caused by this stress can be kept small.

Embodiment 2

Figure 8:
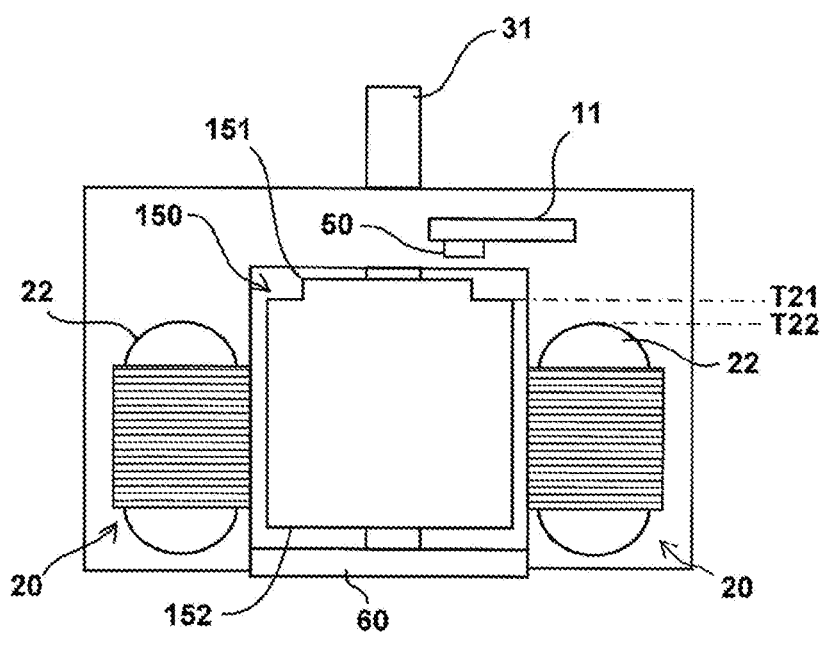
FIG. 8 schematically illustrates an inside of the electric motor according to Embodiment 2 of the present invention.

FIG. 8 schematically illustrates an inside of an electric motor according to Embodiment 2 of the present invention. As in Embodiment 1, a rotor magnet 150 of an electric motor 100 has a sensor magnet unit 151 close to a magnetic sensor 50 and a main magnet unit 152 close to a bracket 60. The sensor magnet unit 151 and the main magnet unit 152 are formed integrally with each other. An external diameter of the sensor magnet unit 151 is smaller than an external diameter of the main magnet unit 152. In an axial direction of a rotary shaft 31, a position T21 of one end on the magnetic sensor 50 side of the main magnet unit 152 is closer to the magnetic sensor 50 than a position T22 of one coil end on the magnetic sensor 50 side of a magnetic flux coil 22 of a stator 20d. Other configurations are similar to those in Embodiment 1.

According to Embodiment 2, a magnetic flux leaking from the magnetic flux coil 22 of the stator 20 can be blocked by the main magnet unit 152. Accordingly, influence of the magnetic flux leaking from the magnetic flux coil 22 of the stator 20 on the magnetic sensor 50 can be kept small. As a result, malfunction of the electric motor 1 caused by phase shift can be made less likely to occur, and a decrease in maximum output of the electric motor 1 can be kept small. This allows the electric motor 1 to keep a high level of efficiency.

Embodiment 3

Figure 9:
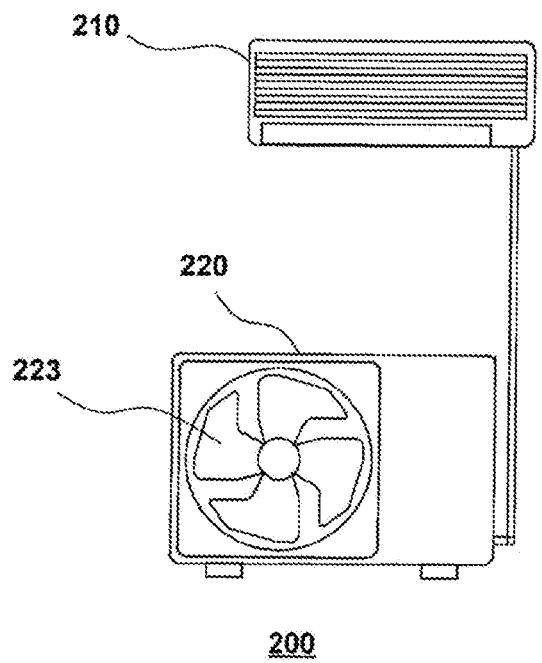
FIG. 9 illustrates a configuration of an air-conditioning apparatus according to Embodiment 3 of the present invention.
Figure 10:
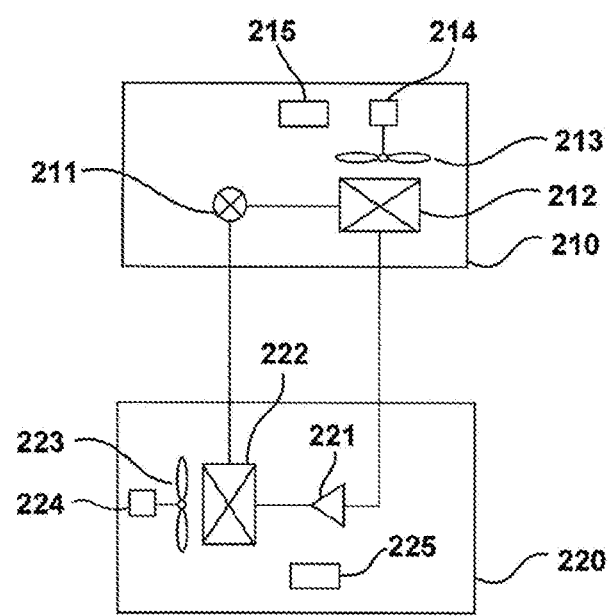
FIG. 10 is a block diagram of the air-conditioning apparatus according to Embodiment 3 of the present invention.

FIG. 9 illustrates a configuration of an air-conditioning apparatus according to Embodiment 3 of the present invention. FIG. 10 is a block diagram of the air-conditioning apparatus according to Embodiment 3 of the present invention. An air-conditioning apparatus 200 includes an indoor unit 210 and an outdoor unit 220 connected to the indoor unit 210. The outdoor unit 220 includes a compressor 221, a heat-source-side heat exchanger 222, an outdoor-unit fan 223 that sends air to the heat-source-side heat exchanger 222, and an electric motor 224. A control unit 225 controls each unit of the outdoor unit 220 and is, for example, a microcontroller. The electric motor 224 is a drive source for the outdoor-unit fan 223 and is controlled by the control unit 225. The indoor unit 210 includes an expansion device 211, a load-side heat exchanger 212, an indoor-unit fan 213 that sends air to the load-side heat exchanger 212, and an electric motor 214. A control unit 215 controls each unit of the indoor unit 210 and is, for example, a microcontroller. The electric motor 214 is a drive source for the indoor-unit fan 213 and is controlled by the control unit 215. The electric motor 1 according to Embodiment 1 or the electric motor 100 according to Embodiment 2 is used as the electric motor 214 and the electric motor 224.

According to Embodiment 3, the indoor-unit fan 213 and the outdoor-unit fan 223 can be efficiently driven.

Although the electric motor 1 or the electric motor 100 is used as both of the electric motor 214 and the electric motor 224 in Embodiment 3, this configuration is not restrictive. It is only necessary that the electric motor 1 or the electric motor 100 be used as at least one of the electric motor 214 and the electric motor 224.

The electric motor 1 and the electric motor 100 can be mounted not only in the air-conditioning apparatus 200, but also in a ventilation fan, a household electrical appliance, a machine tool, and the like.

REFERENCE SIGNS LIST electric motor 10 mold stator 11 built-in substrate 12 mold resin 13 lead wire 14 lead-out unit 20 stator 21 stator core 22 magnetic flux coil 22U U-phase winding 22V V-phase winding 22W W-phase winding 23 insulator 30 rotor 31 rotary shaft 32 rotor insulating unit 33 output-side shaft bearing 34 counter-output-side shaft bearing 40 rotor magnet 41 sensor magnet unit 42 main magnet unit 50 magnetic sensor 51 sensor unit amplifying unit 53 pin 54 pin 60 bracket 61 press-fitted part 70 control unit 71 overcurrent detection resistor 80 power IC 81 power transistor 81A power transistor 81B power transistor 81C power transistor 81D power transistor 81E power transistor 81F power transistor 82 gate drive circuit 83 protection circuit 100 electric motor 150 rotor magnet 151 sensor magnet unit 152 main magnet unit 200 air-conditioning apparatus 210 indoor unit 211 expansion device 212 load-side heat exchanger 213 indoor-unit fan 214 electric motor 215 control unit 220 outdoor unit 221 compressor 222 heat-source-side heat exchanger 223 outdoor-unit fan 224 electric motor 225 control unit

The invention claimed is:

1. An electric motor comprising:
a stator having an iron core and a magnetic flux coil wound around the iron core;
a rotor having a rotary shaft and a cylindrical rotor magnet provided on an outer circumference of the rotary shaft; and
a magnetic sensor having a sensor unit that outputs an electric signal based on an applied magnetic flux,
the stator and the rotor being disposed so that the rotor magnet faces the iron core,
wherein
the rotor magnet has a main magnet unit and a sensor magnet unit that is formed integrally with the main magnet unit and has an external diameter smaller than an external diameter of the main magnet unit,
the magnetic sensor is disposed beside the sensor magnet unit and outputs the electric signal upon detection of a position of the rotor based on a magnetic flux of the sensor magnet unit, and
an outer circumferential edge of the sensor magnet unit is located farther away from the rotary shaft than a center of the sensor unit is located away from the rotary shaft, and
a position of an end of the main magnet unit in an axial direction of the rotary shaft is closer to the magnetic sensor than a position, in the axial direction of the rotary shaft, of one coil end on the magnetic sensor side of the magnetic flux coil of the stator is to the magnetic sensor.

2. The electric motor of claim 1, wherein
the center of the sensor unit is located closer to the sensor magnet unit than a center of the magnetic sensor is to the sensor magnet unit.

3. The electric motor of claim 2, wherein
a position of an end of the sensor magnet unit in the axial direction of the rotary shaft is closer to the magnetic sensor than the position, in the axial direction of the rotary shaft, of the one coil end on the magnetic sensor side of the magnetic flux coil of the stator is to the magnetic sensor.

4. The electric motor of claim 1, wherein
a position of an end of the sensor magnet unit in the axial direction of the rotary shaft is closer to the magnetic sensor than the position, in the axial direction of the rotary shaft, of the one coil end on the magnetic sensor side of the magnetic flux coil of the stator is to the magnetic sensor.

5. The electric motor of claim 1, wherein
the magnetic sensor has an amplifying unit that amplifies the electric signal output from the sensor unit; and
an output signal of the magnetic sensor is a digital signal.

6. The electric motor of claim 5, wherein
the sensor unit is made of a semiconductor other than silicon;
the amplifying unit is made of silicon, and
a substrate on which the magnetic sensor is mounted is molded integrally with the stator with use of a resin.

7. An air-conditioning apparatus comprising the electric motor of claim 1 as a drive source of at least one of an indoor-unit fan and an outdoor-unit fan.

* * * * *